UNITED STATES PATENT OFFICE.

DARWIN ALMY, OF PROVIDENCE, RHODE ISLAND.

WATER-TUBE BOILER.

982,198.　　　　　Specification of Letters Patent.　　Patented Jan. 17, 1911.

Application filed January 13, 1910.　Serial No. 537,880.

*To all whom it may concern:*

Be it known that I, DARWIN ALMY, a citizen of the United States, residing at Providence, in the county of Providence and State of Rhode Island, have invented a new and useful Improvement in Water-Tube Boilers, of which the following is a specification.

The present invention has relation to improvements in water tube boilers, and more especially in steam generators associated with or forming a part of the same, its object stated generally comprehending the production of a generator so constructed and arranged as to raise steam in a minimum period of time after the lighting of the fires.

Figure 1:
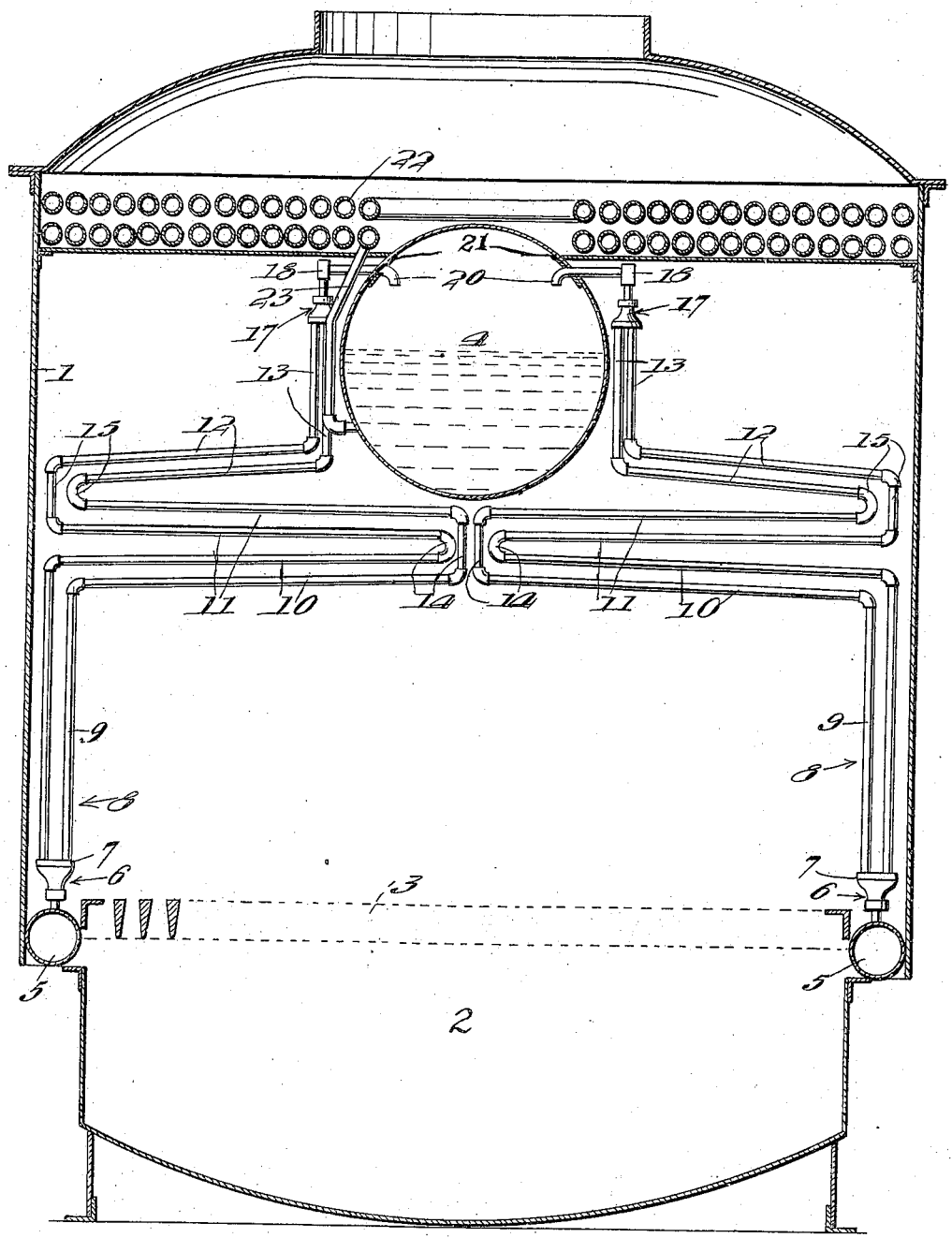
Figure 2:
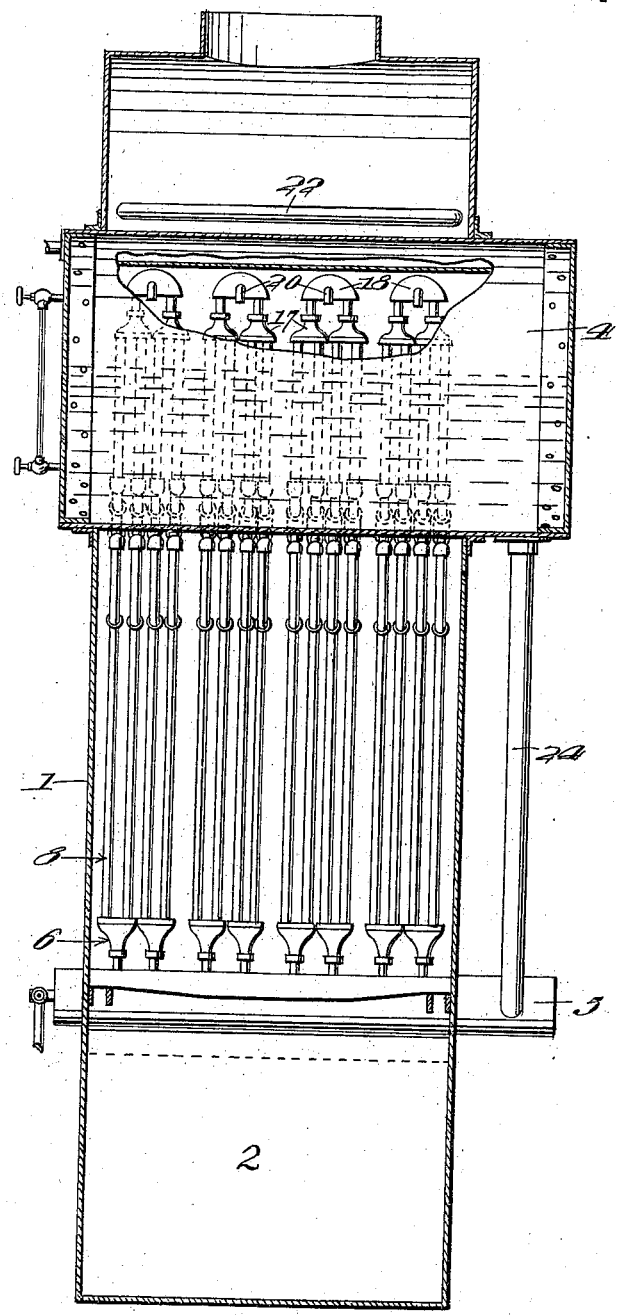

A structural embodiment of the invention is illustrated in the accompanying drawings, wherein, Figure 1 is a vertical sectional view of the invention complete. Fig. 2 is a sectional view taken at right angles to Fig. 1.

Reference being had to said drawings, and to the numerals marked thereon, 1 indicates in a general manner the casing of the generator, 2 the fire box, 3 the grate, and 4 the steam and water drum, the element last mentioned being arranged horizontally within said casing and located in the upper portion thereof.

At each side of the grate there is arranged a horizontal manifold 5 suitably connected up to the water supply pipes and being connected at its upper surface by a series of short vertical pipes with fittings 6 of that type generally known as a "four-way-Y." Each of said "Y's" has connected to its enlarged head portion 7 the lower ends of a group of four of the heating tubes 8, the particular arrangement of which constitutes as originally stated, one of the principal features of this invention. The tubes of each group as shown in Fig. 1 are formed in sections and comprise each a vertical portion or section 9 arranged adjacent to and parallel with the side wall of the casing 1, a horizontal section 10 connected at its outer end to the upper end of section 9 and extending inwardly toward the center of said casing directly over the fire box, a second horizontal section 11 arranged directly above the first mentioned horizontal section, but extending in the opposite direction, *i. e.*, toward the casing wall, a third horizontal section 12 extending inwardly and inclined slightly upward toward the steam and water drum 4, and a top vertical section 13 arranged adjacent to said steam and water drum and at right angles to the axis thereof, the lower end of this vertical section being connected or coupled to the inner end of the uppermost horizontal section 12. The inner ends of the horizontal sections 10 and 11 of each tube are connected together by a coupling 14, and the outer ends of the sections 11 and 12 by a similar coupling 15.

The upper ends of each of the groups of tubes are connected to the head 16 of a four-way-Y fitting 17, which is identical with the fittings 6 previously described but is inverted with respect thereto, as shown. These "Y's" are arranged in pairs, each pair having their stems opening into a housing-like member 18 generally termed a "header." The headers are in turn, provided each with a spout 19 which enters the upper portion of the steam and water drum 4 and has its free or discharge end turned downwardly, as indicated by the numeral 20. At the points where the spouts open into the steam and water drum, the latter is preferably provided with suitable reinforcing plates 21.

Above the steam and water drum are arranged the tubes 22 which have a suitable pipe connection 23 with the lower portions of said steam and water drum and may be of any preferred construction. The steam and water drum has also a direct pipe connection 24 with the manifold pipes 5.

From a consideration of the foregoing, it will be apparent that the arrangement of the heating tubes is such that the water contained within the same will be heated in an extremely short time to an extent sufficient to convert it into steam which will be directed through the spouts 19 into the steam and water drum and discharged upon the water therein, the rapid conversion into steam of the water in the generating tubes being due to the fact that the several horizontal sections of the groups of tubes extend backward and forward directly over the fire box and are thus subjected to the intense heat thereof. It will also be seen that the employment of four-way-Y's enables a considerably greater number of tubes to be utilized than if nipples or similar single tube connections were made use of, and it also enables the tubes of each group to be located close to each other so as to preclude their occupying too much space within the generator.

The use of the header 18 is of particular advantage in the connection of tubular steam generators in that by reason of the header having but one connection with the steam and water drum, practically the full strength of the shell of the steam and water drum is maintained.

The employment of the headers 18 and the connection of the same to a pair of the upper Y-joints render it possible for each header to receive the steam from eight of the heating tubes at once, the steam being discharged therefrom, together with such water as it may carry up with it, directly upon the water in the steam and water drum.

It is evident that the header 18 could be so constructed as to be connected to four or even more of the four-way-Y fittings and still have but one connection to the steam and water drum of such capacity as to control circulation of the steam and water. It is also evident that in the knocked-down condition the structure, being practically formed of pipe, can be shipped in a very small space and yet the same is of such a nature that any practical steam fitter can set it up in operative condition by the use of very simple tools.

Having thus described my invention, I claim as new and desire to secure by Letters Patent;—

1. In a steam generator, the combination with a steam drum and a firebox underlying the same, of manifolds located in the firebox, a four-way Y connected to each manifold, four tubes connected to each Y, said tubes extending vertically, then horizontally inwardly and at the center of the structure extending by means of return bends outwardly in a horizontal direction to thereby completely underlie the steam drum, then being turned inwardly toward the steam drum at the base of the latter, and finally upwardly to extend vertically on opposite sides of the steam drum throughout the major portion of the height thereof, an inverted four-way Y connecting the tubes at their upper end, a header connected to the upper Y and disposed above same, and a horizontally disposed spout extending from the header into the steam drum, whereby the tubes completely inclose the steam drum on its bottom and opposite sides.

2. In a steam generator, the combination with a steam drum and a manifold, a pair of four-way Y's each connected to the manifold, four pipes connected to each Y, said pipes having horizontal portions underlying the drum and vertical portions which extend along the major portion of the height of the drum, an inverted Y connected to each group of four pipes at points adjacent the steam drum, a header for said pair of Y's at points adjacent the steam drum, a connection at each end of the header connected to the respective inverted Y's, and a spout connected to the header and extending into the steam drum.

In testimony whereof I have signed my name to this specification in the presence of two subscribing witnesses.

DARWIN ALMY.

Witnesses:
ADA E. HAGERTY,
J. A. MILLER.